July 26, 1960 O. C. WEHRIG 2,946,867
BURGLAR ALARM
Filed Aug. 14, 1958
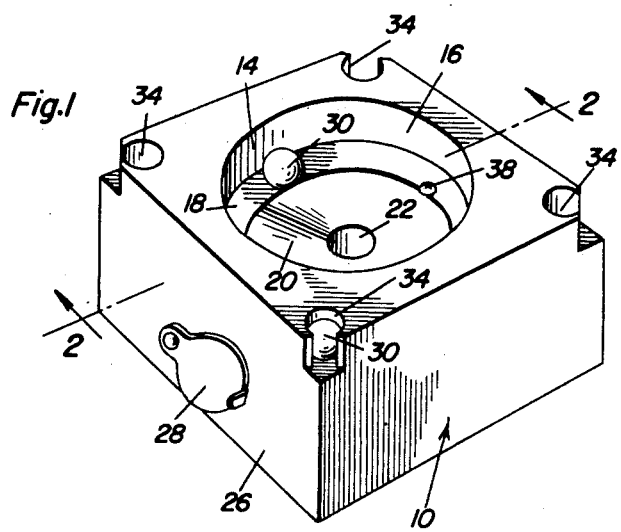
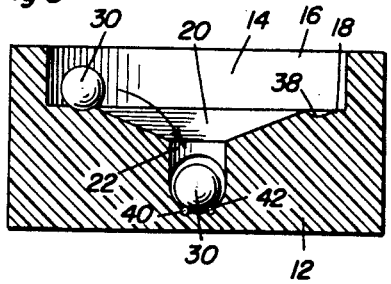
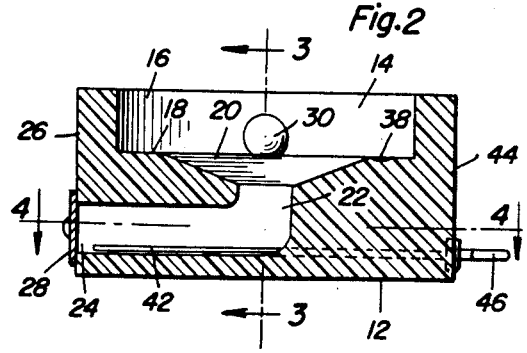
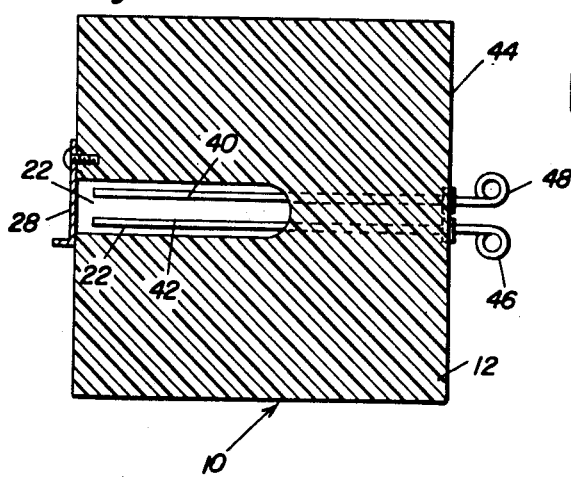
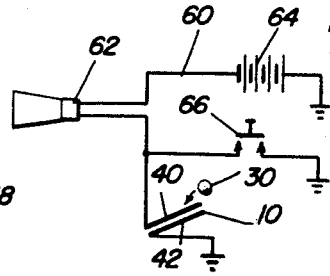
Otto C. Wehrig
INVENTOR.
BY *Clarence A. O'Brien*
*and Harvey B. Jacobson*
Attorneys

United States Patent Office 2,946,867
Patented July 26, 1960

2,946,867

BURGLAR ALARM

Otto C. Wehrig, 442 Burges St., Seguin, Tex.

Filed Aug. 14, 1958, Ser. No. 754,971

7 Claims. (Cl. 200—61.45)

This invention relates to alarm devices and more particularly to a burglar alarm for a motor vehicle.

An object of the invention is to provide a mechanically simple and exceedingly dependable and foolproof burglar alarm for a motor vehicle which responds to movements or vibrations of the motor vehicle to close the motor vehicle horn circuit. The invention is so arranged that the location of the burglar alarm would have to be discovered and the potential thief would have to then learn how to reset the alarm before the alarm could be discontinued.

A more particular object of the invention is to provide a mechanically simple base with one or more balls of conductive material, for instance steel balls, perched so that they will roll to a position at which the circuit of the horn of a motor vehicle is closed in response to any shaking of the base.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a burglar alarm constructed in accordance with the invention;

Figure 2 is a transverse sectional view taken on the line 2—2 of Figure 1;

Figure 3 is a sectional view taken on the line 3—3 of Figure 2;

Figure 4 is a sectional view taken on the line 4—4 of Figure 2; and

Figure 5 is a schematic wiring diagram of the conventional automobile or truck horn circuit, showing one manner of wiring the burglar alarm with the horn circuit.

In the accompanying drawings there is a burglar alarm 10 which is constructed to exemplify the principles of the invention. The burglar alarm has a base 12 made of non-conductive material, for instance plastic or wood, and is adapted to be placed discreetly within the motor vehicle so that it is not easily detected. This may be in the trunk compartment, the glove compartment, under the seat or any other place selected by the motor vehicle owner and in accordance with his better judgment and the space available in his particular brand and model of motor vehicle. Base 12 has a flat bottom surface so that it may rest flush on a flat supporting surface and has an upwardly opening recess 14. The recess has a cylindrical side wall 16 with a land or platform 18 adjacent to it and at right angles to the cylindrical side wall 16. The center part 20 of the recessed bottom is in the shape of a truncated cone, that is, funnel-shaped, and has a central passage 22 in registry therewith. Passage 22 is curved at the bottom (Figure 2) and extends to an opening 24 in one wall 26 of the base 12. A closure, for instance a small hinged door 28, covers opening 24 to retain the ball 30 in passage 22 after the ball enters that passage.

Ball 30 is made of conductive material, for instance steel, and is one of a group of four balls supplied with the burglar alarm, although the number may be increased or decreased. Four upwardly opening pockets 34 are at the four corners of the base 12 in order to receive a single ball in each for storage. When placed in recess 14, one or more balls may be used simultaneously. However, each ball that is used is placed in a small, upwardly opening well 38 in bottom 18 adjacent to cylindrical wall 16. The depth and shape of the well 38 will determine how much oscillation or shaking is necessary to have the one or more balls 30 roll therefrom, down the funnel-shaped bottom 20 of the recess and enter passage 22.

When the ball 30 (Figure 3) enters passage 22, it becomes seated on a pair of electrical conductive wires or strips 40 and 42 that are approximately parallel to each other and that extend along the bottom of passage 22 to a position close to door 28. These conductive strips extend through a wall 44 of base 12 and have terminals 46 and 48 thereon. The terminals may be in the form of binding posts or merely eyes as shown in Figure 4, so long as it is rather easy to connect a pair of electrical conductors thereto.

Referring to Figure 5 the conventional automobile horn circuit 60 is shown as having horn 62 connected in series with battery 64 and horn button switch 66. The horn button switch grounds the circuit 60, enabling the horn to sound. Burglar alarm 10 is connected in parallel with the horn button switch 66 and establishes a separate ground path for the horn 62 as soon as ball 30 bridges the two conductor strips 40 and 42. Therefore, one terminal 46, for instance, is attached to ground in the motor vehicle, and the other is connected between the horn button or horn ring switch 66 and the horn 62.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A circuit closing device for motor vehicles or other movable objects, said device comprising a non-conductive base having an upwardly opening recess therein, said recess having a bottom wall within which there is at least one well, said bottom wall having a downwardly sloping part, a conductive ball adapted to seat in said well and to be separated therefrom in response to movement of said base so that said ball is movable down the sloping part of the bottom of said recess, said base having a passage in registry with the bottom of said recess and into which said ball is adapted to pass, and a pair of conductors in said passage and onto which said ball is adapted to fall to complete an external electric circuit.

2. A circuit closing device for motor vehicles or other movable objects, said device comprising a non-conductive base having an upwardly opening recess therein, said recess having a bottom wall within which there is at least one well, said bottom wall having a downwardly sloping part, a conductive ball adapted to seat in said well and to be separated therefrom in response to movement of said base so that said ball is movable down the sloping part of the bottom of said recess, said base having a passage in registry with the bottom of said recess and into which said ball is adapted to pass, a pair of conductors in said passage and onto which said ball is adapted to fall to complete an external electric circuit, and said passage terminating in an opening at one wall of said base, a closure for said opening through which said ball may be withdrawn in order to separate said ball from said conductors.

3. The combination of claim 2 wherein there is a plurality of pockets in said base within which to store conductive balls whereby a number of said balls are available for individual or simultaneous use in said recess.

4. A circuit closer comprising a base, an upwardly opening recess in said base and having a sloping bottom, said base having a passage in registry with said bottom of said recess, a plurality of upwardly opening wells in said recessed bottom and adapted to accommodate electrically conductive balls, a closure at the opposite end of said passage from which to withdraw a ball from said passage, a pair of conductors in said passage and adapted to be bridged by a ball falling into said passage, and means connected with said conductors for attaching said conductors to an external circuit.

5. A circuit closer comprising a base, an upwardly opening recess in said base and having a sloping bottom, said base having a passage in registry with said bottom of said recess, said base having a land at the upper periphery of said recess, a plurality of upwardly opening wells in said land and adapted to accommodate electrically conductive balls, a closure at the opposite end of said passage from which to withdraw a ball from said passage, and a pair of conductors in said passage and adapted to be bridged by a ball falling into said passage.

6. A circuit closer comprising an insulating base having a recess with a sloping wall, said base also having a passage registered with said sloping wall, said recess having a plurality of ball accommodating wells to support the balls so that they are adapted to roll from the wells and down said sloping wall and into said recess in response to movement of said base, a pair of conductors spaced apart a distance smaller than the diameter of said balls and located in said passage so that when at least one of said balls enters said passage it falls on said conductors thereby bridging the conductors.

7. The circuit closer of claim 6 wherein said base has a land at the upper part of said sloping wall and in which said wells are located.

References Cited in the file of this patent
UNITED STATES PATENTS

| | | |
|---|---|---|
| 1,172,047 | Rademaker | Feb. 15, 1916 |
| 1,178,719 | Hildebrand | Apr. 11, 1916 |
| 1,298,055 | Kershaw | Mar. 25, 1919 |
| 2,618,712 | Moledzky | Nov. 18, 1952 |